(12) United States Patent
Silvennoinen

(10) Patent No.: US 10,619,977 B2
(45) Date of Patent: Apr. 14, 2020

(54) SUPPORT FOR MOUNTING AN ACCESSORY TO A WEAPON

(71) Applicant: MASINA-TUOTE OY, Puuppola (FI)

(72) Inventor: Martti Silvennoinen, Puuppola (FI)

(73) Assignee: Masina-Toute Oy, Puuppola (FI)

( * ) Notice: Subject to any disclaimer, the term of this patent is extended or adjusted under 35 U.S.C. 154(b) by 87 days.

(21) Appl. No.: 15/959,340

(22) Filed: Apr. 23, 2018

(65) Prior Publication Data

US 2018/0245883 A1 Aug. 30, 2018

Related U.S. Application Data

(63) Continuation-in-part of application No. 14/631,164, filed on Feb. 25, 2015, now abandoned.

(30) Foreign Application Priority Data

Feb. 27, 2014 (FI) ...................................... 20145190

(51) Int. Cl.
*F41G 11/00* (2006.01)
*F41G 1/387* (2006.01)
*F16B 2/12* (2006.01)

(52) U.S. Cl.
CPC ............ *F41G 11/003* (2013.01); *F41G 1/387* (2013.01); *F16B 2/12* (2013.01)

(58) Field of Classification Search
CPC .... F41G 11/003; F41G 11/004; F41G 11/001; F41G 1/40; F41G 1/41; F41G 1/38; F41G 1/387; F16B 2/12; F16B 2/18; F16B 21/04; Y10T 403/589; Y10T 292/0868; Y10T 403/604; Y10T 403/598; Y10T 403/581; B25B 5/02; B25B 5/068; B25B 5/085; B25B 5/08; B25B 5/102; B25B 5/163

USPC ................. 42/124, 127; 248/223.41, 231.41, 248/229.12, 229.22, 228.3; 403/93, 94, 403/96, 98, DIG. 4, 320; 411/347, 349, 411/554; 269/43, 254 CS, 6
See application file for complete search history.

(56) References Cited

U.S. PATENT DOCUMENTS

| 2,659,150 A | 11/1953 | Feerick |
| 2,803,907 A | 8/1957 | Weaver |
| 3,750,318 A | 8/1973 | Burris |
| 3,877,166 A | 4/1975 | Ward |
| 4,113,221 A | 9/1978 | Wehner |

(Continued)

FOREIGN PATENT DOCUMENTS

| CN | 202339146 | 7/2012 |
| DE | 202011110146 | 2/2013 |
| GB | 2504466 | 2/2014 |

OTHER PUBLICATIONS

Finnish Search Report, Finnish Application No. FI 20145190, dated Oct. 1, 2014.

(Continued)

*Primary Examiner* — Ingrid M Weinhold
(74) *Attorney, Agent, or Firm* — Fildes & Outland, P.C.

(57) ABSTRACT

The invention relates to a support for mounting an accessory to a weapon. The support includes a bracket and a locking piece fitted in the bracket. The support further includes spring elements, arranged to act on the locking piece, the work direction (W) of the elements being parallel to the locking direction (L) of the locking piece arranged in the bracket.

16 Claims, 10 Drawing Sheets

(56) References Cited

U.S. PATENT DOCUMENTS

| | | | |
|---|---|---|---|
| 4,305,180 A * | 12/1981 | Schwartz | F16B 21/04 |
| | | | 285/396 |
| 4,398,322 A * | 8/1983 | Ewen | F16B 21/04 |
| | | | 24/595.1 |
| 5,570,529 A | 11/1996 | Amelino | |
| 6,322,279 B1 | 11/2001 | Yamamoto et al. | |
| 7,188,978 B2 | 3/2007 | Sharrah et al. | |
| 7,614,760 B2 | 11/2009 | Sharrah et al. | |
| 8,226,267 B2 | 7/2012 | Sharrah et al. | |
| 8,276,307 B2 | 10/2012 | Deros | |
| 8,371,729 B2 | 2/2013 | Sharrah et al. | |
| 8,458,946 B1 | 6/2013 | Pintsch | |
| D698,000 S | 1/2014 | Beckett et al. | |
| 8,769,859 B2 | 7/2014 | Li et al. | |
| 8,807,901 B1 * | 8/2014 | Lombardo | E02F 9/2841 |
| | | | 411/347 |
| 8,925,238 B2 | 1/2015 | Anderson | |
| 9,212,777 B2 | 12/2015 | Shi | |
| 2001/0027620 A1 | 10/2001 | Wooten et al. | |
| 2004/0148842 A1 | 8/2004 | Aalto et al. | |
| 2006/0099838 A1 * | 5/2006 | Meyers | E02F 9/006 |
| | | | 439/134 |
| 2010/0242332 A1 | 9/2010 | Teetzel et al. | |
| 2011/0023348 A1 | 2/2011 | Karagias | |
| 2011/0167703 A1 | 7/2011 | Deros | |
| 2012/0210624 A1 | 8/2012 | Schneider et al. | |
| 2013/0148367 A1 | 6/2013 | Sharrah et al. | |

OTHER PUBLICATIONS

English abstract of CN202339146.
English abstract of DE 202011110146.

* cited by examiner

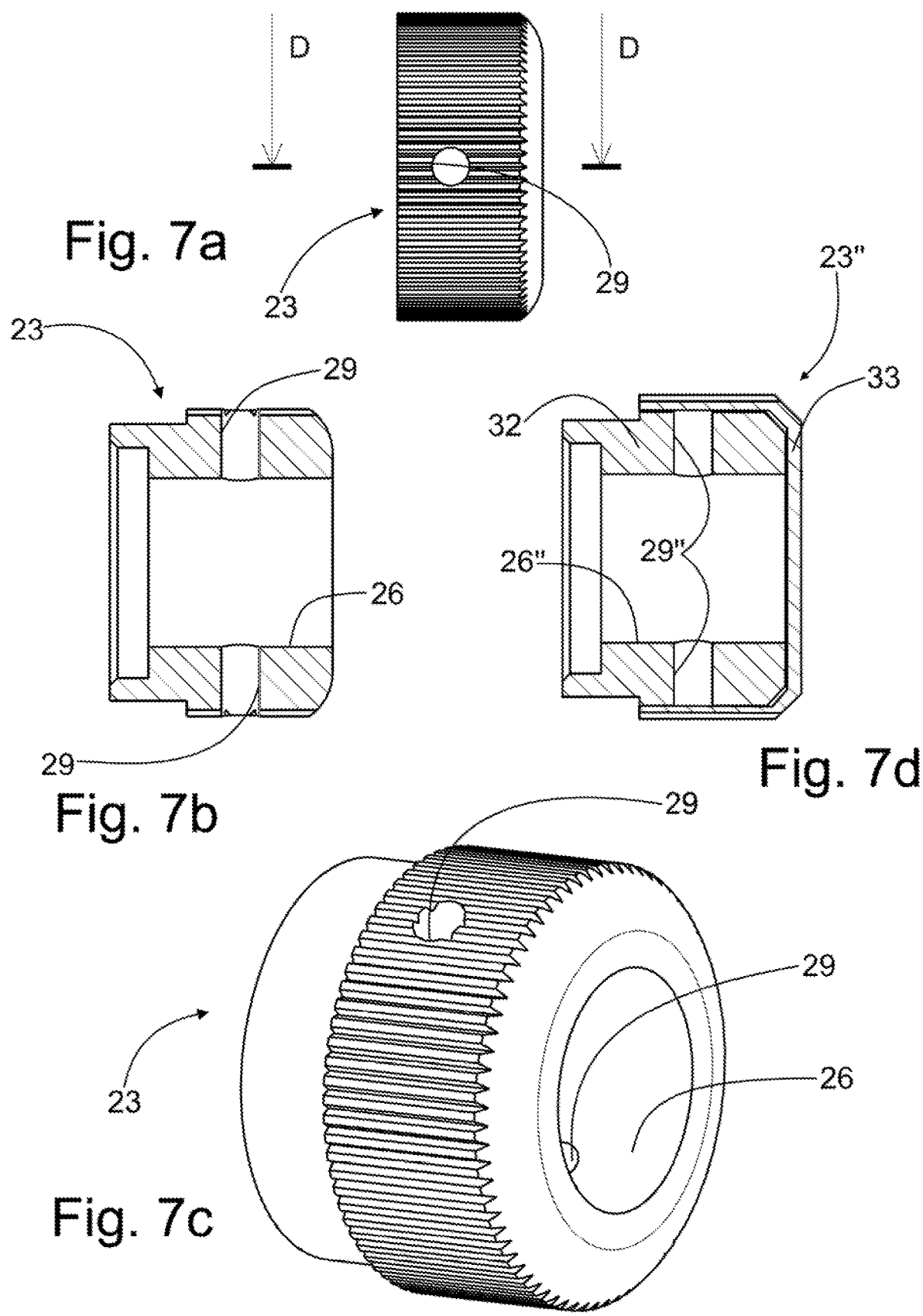

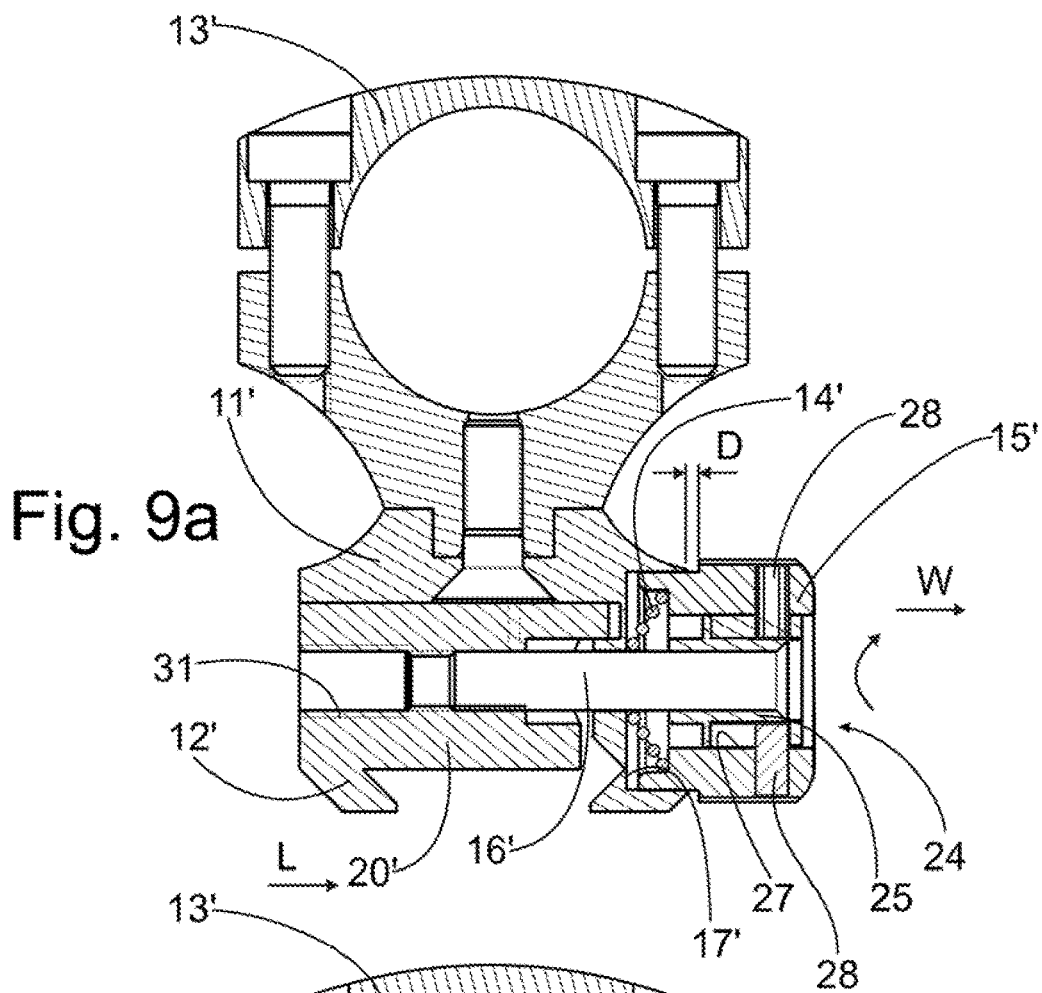
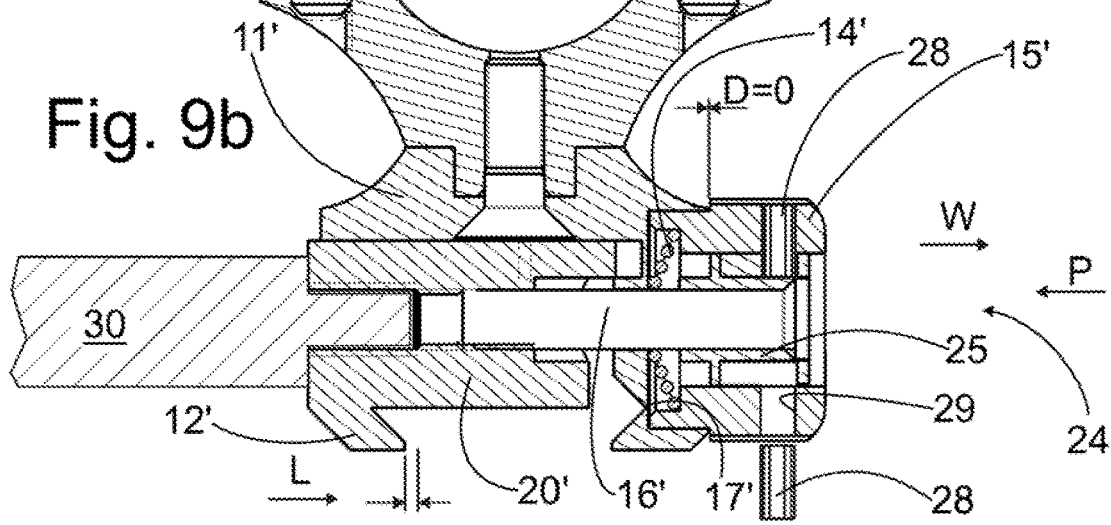

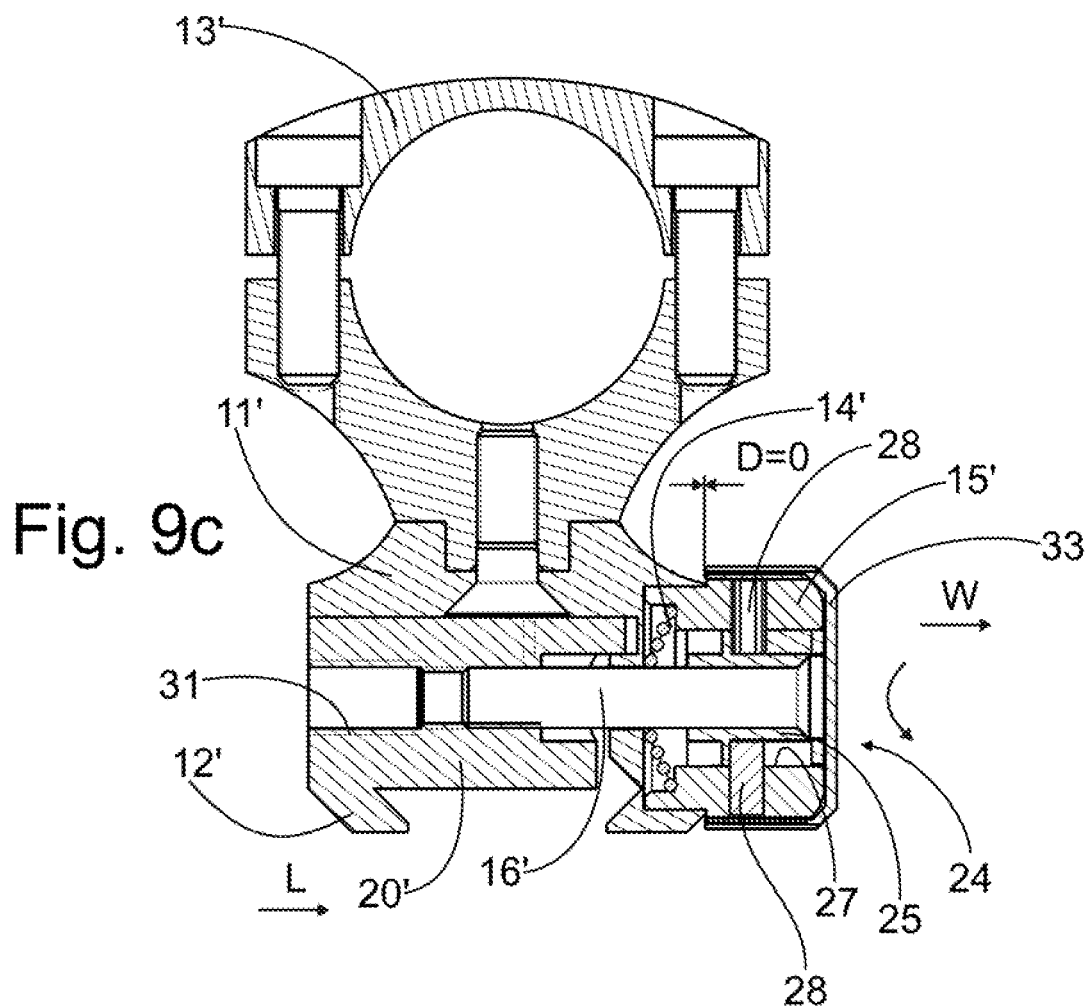

SUPPORT FOR MOUNTING AN ACCESSORY TO A WEAPON

CROSS REFERENCE TO RELATED APPLICATIONS

This application is a continuation-in-part of U.S. application Ser. No. 14/631,164 filed Feb. 25, 2015, which, is based on and claims priority under 35 U.S.C. 119 from Finnish Patent Application No. 20145190 filed Feb. 27, 2014.

TECHNICAL FIELD

This invention relates to a support for mounting an accessory to a weapon, the support including a bracket and a locking piece fitted to the bracket.

BACKGROUND OF THE INVENTION

Various weapons, particularly rifles, are used for different purposes. The selection of a weapon is influenced, for example, by the game animal to be shot and the hunting conditions. Weapons are also used in competitions, such as so-called practical shooting. Particularly sighting devices, such as sniperscopes, exist for various purposes. Thus, when shooting different game animals, one person often has several weapons, which have different sighting devices for different game animals. Sniperscopes, in particular, are expensive and susceptible to damage, such as dents, during storage and transportation. The alignment of sighting devices relative to the weapon may also change. In this case, the accuracy of the weapon deteriorates after the sighting device has been installed.

Today, a so-called Picatinny™ rail, the official name of which is MIL-STD-1913, is often used for mounting accessories to a weapon. Accessories include sniperscopes, tactical lights and laser aiming devices. Torches, additional handles and grips, front legs, bayonets and red dot sights can also be mounted as accessories. The length of the rails is selected as needed and they are mounted to the different parts of the frame of the weapon, such as to the sides or under the barrel. For example, a sniperscope usually includes two supports both equipped with a bracket. Each bracket is fastened to the rail with a locking piece included in the bracket.

The support can be a part of the accessory. The bracket included in the support is slid onto the rail from either end. Alternatively, the bracket is placed directly around the rail with the locking piece in the released state. After the setup, the locking pieces of the bracket are tightened in place as firmly as possible using bolts, screws or latches.

In prior art brackets, the position of the locking piece relative to the bracket is unstable. Thus, the mounting of the bracket is unreliable. Correspondingly, different mounting devices of the bracket include several different components, which makes the design of a prior art bracket complicated. In addition, the removal and mounting of the bracket is time-consuming and generally requires tools. The bracket and particularly the mounting devices also include protruding parts, which increase the risk of damage and accidents and can lead to an inadvertent release of the locking piece from the locked position. In this case, the accessory together with the bracket can detach from the weapon. Sighting devices in particular are sensitive. Thus, even a small clearance or a change in the bracket position spoils the accuracy of the weapon.

SUMMARY OF THE INVENTION

The object of the invention is to provide a novel support for mounting an accessory to a weapon, the support having a simpler and more compact design than before and enabling easier and quicker release and mounting than heretofore. The characteristic features of this invention become apparent from the appended claims. The support can be quickly used with one grip without tools. Thus, the accessory can be mounted and released quickly and reliably without tools. During the reinstallation, the position of the bracket remains unaltered, and the bracket can thus be used even for mounting high-magnification sighting devices without deterioration of accuracy. In addition, the locking piece remains in the locked position reliably and the locking is clearance-free and strong.

These and other features and advantages of the invention will be more fully understood from the following detailed description of the invention taken together with the accompanying drawings.

BRIEF DESCRIPTION OF THE DRAWINGS

The appended drawings, illustrate some of the embodiments of the invention, in which:

FIG. 1b is an axonometric view of the support of FIG. 1a;

FIG. 1c is a lateral view of the support of FIG. 1a;

FIG. 2b is a lateral view of the bracket of FIG. 2a;

FIG. 3b is a lateral view of the wedge piece of FIG. 3a;

FIG. 3c is a bottom view of the wedge piece of FIG. 3a;

FIG. 3d is a partial cross-sectional view of the wedge piece of FIG. 3a;

FIG. 5b is an axonometric view of the support of FIG. 5a;

FIG. 5c is a lateral view of the support of FIG. 5a;

FIG. 7a is a lateral view of a rotary knob according to the invention;

FIG. 7b is a cross-sectional view of the plane D-D of FIG. 7a;

FIG. 7c is an axonometric view of the rotary knob of FIG. 7a;

FIG. 7d is a modification of the rotary knob according to the invention;

FIG. 8b is a diagonal top view of the slide cross-sectional view of the plane E-E of FIG. 8a;

FIG. 8c is a cross-sectional view of the plane E-E of FIG. 8a;

FIG. 9a shows the support in the idle position;
FIG. 9b shows the support in the open position; and
FIG. 9c shows the support in the secured position.

DETAILED DESCRIPTION OF THE INVENTION

Figure 1A:
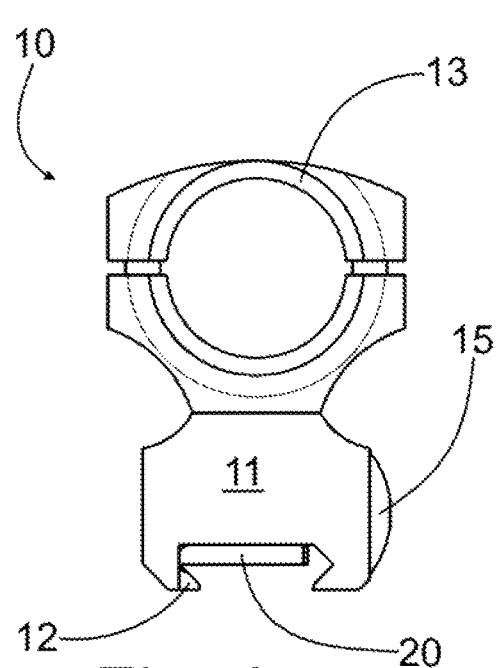
FIG. 1a is a front view of the support according to the invention.
Figure 1B:
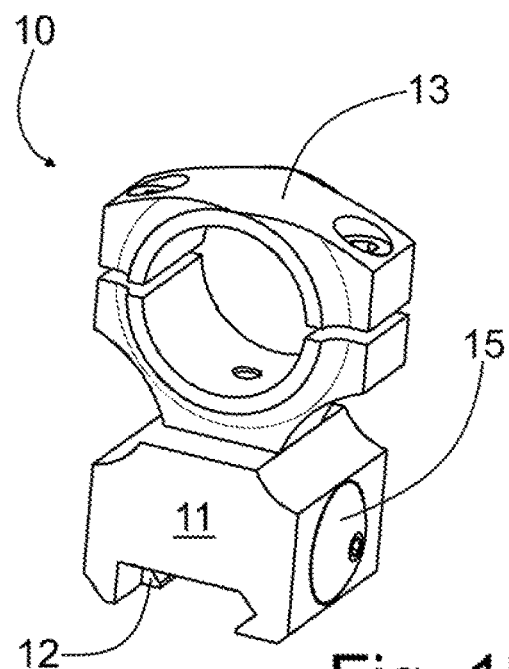
Figure 1C:
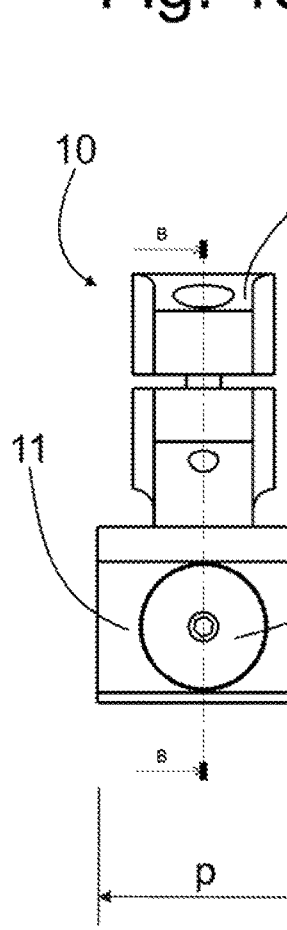
Figure 1D:
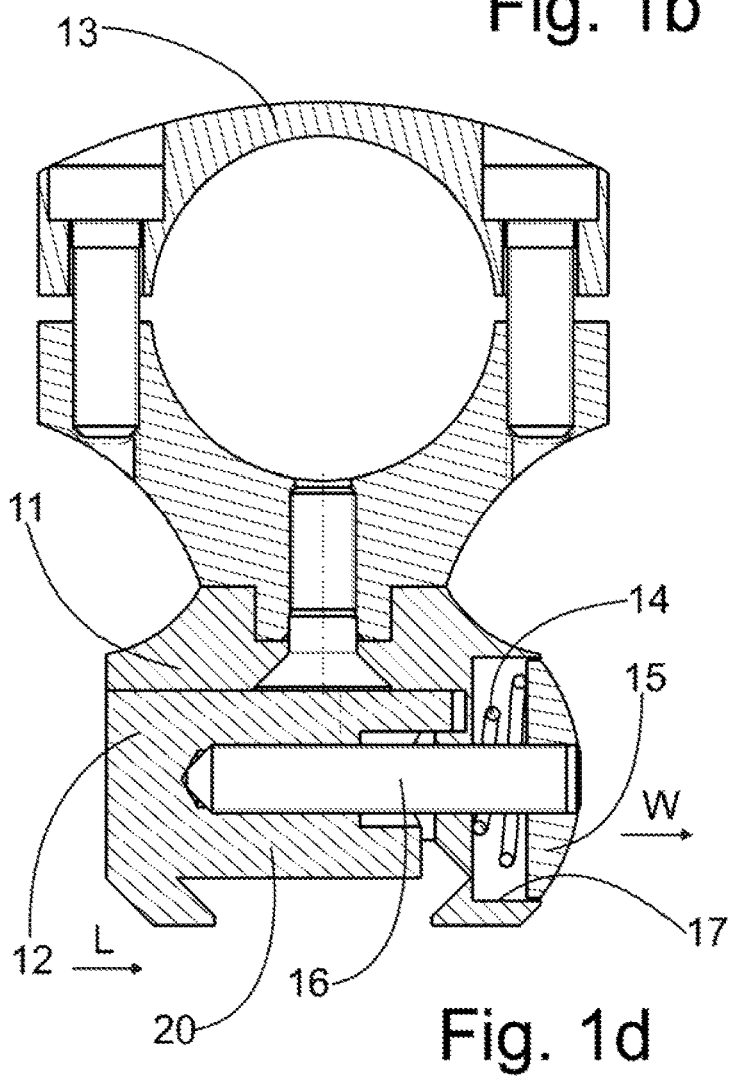
FIG. 1d is a cross-sectional view of the plane B-B of FIG. 1c.
Figure 5A:
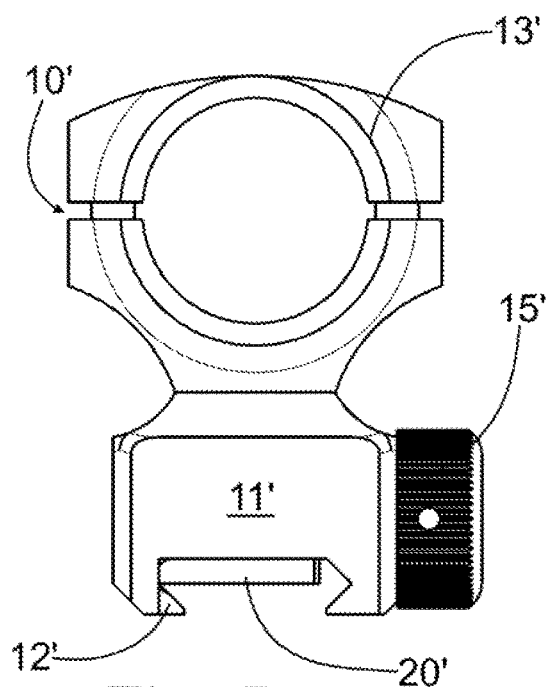
FIG. 5a is a front view of a second embodiment of the support according to the invention.
Figure 5B:
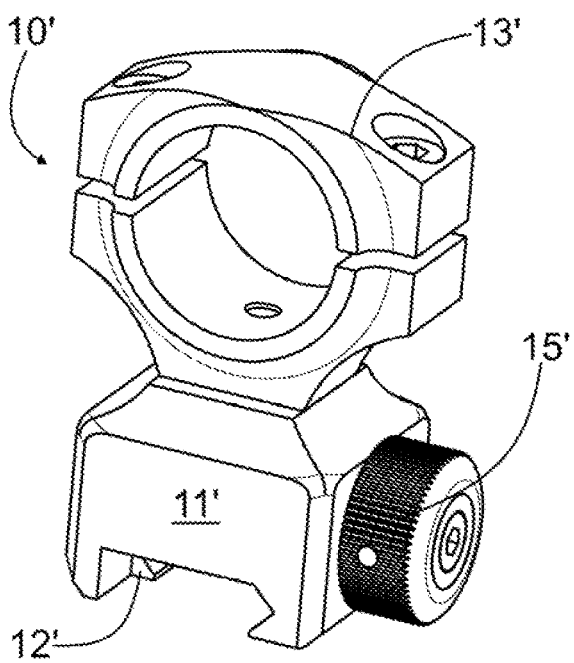
Figure 5C:
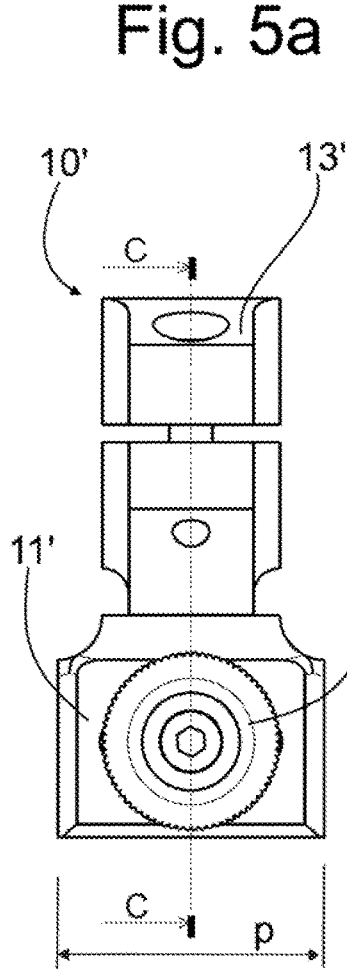
Figure 5D:
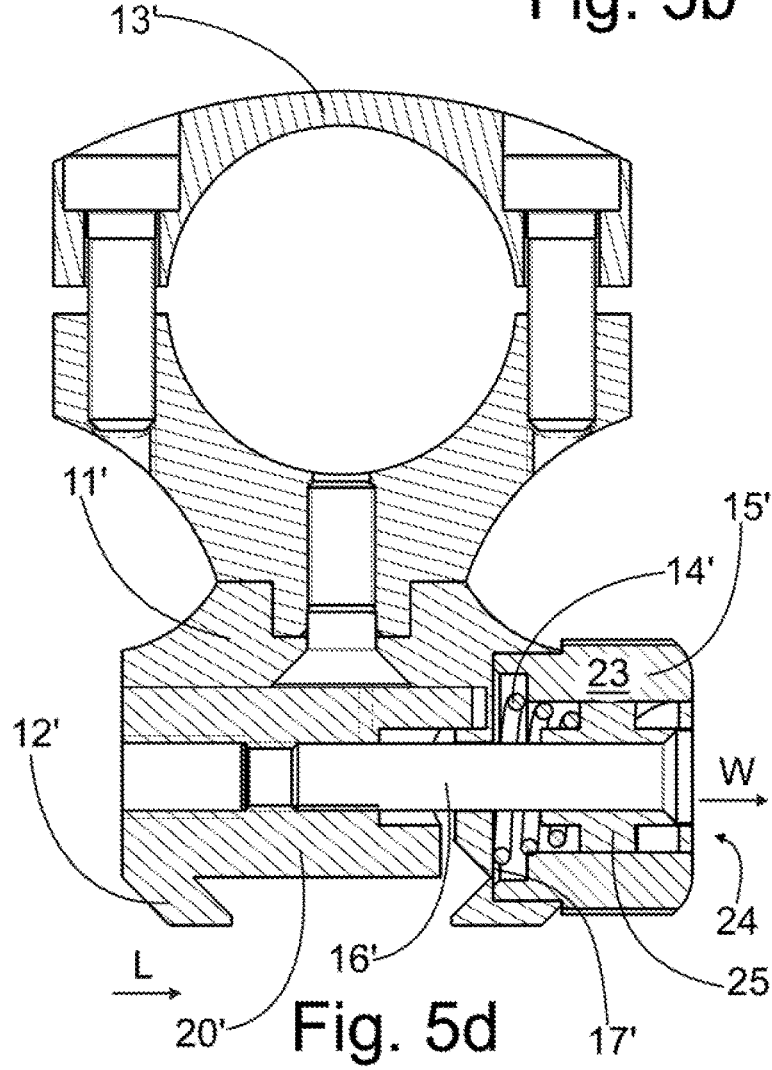
FIG. 5d is a cross-sectional view of the plane C-C of FIG. 5c.

FIGS. 1a to 1d illustrate a support 10 for mounting a sniperscope, for example. Generally, the support can be used to mount almost any accessory to a weapon, more precisely, to a rail arranged in the weapon. The rail may be separately mounted to the weapon or the rail is formed as a part of a breech carrier, for example (not shown). The support 10 includes a bracket 11 and a locking piece 12. In FIGS. 1a to 1d, a ring 13 for a sniperscope is additionally connected to the bracket 11 with a screw. Two supports, more precisely, two separate brackets with rings, are usually needed to mount one sniperscope. Instead of a ring, another accessory can be mounted to the bracket. According to the invention, the support 10 further includes spring elements 14 for forcing the locking piece 12 fitted in the bracket 11 to a locked position. In other words, the support 10 includes spring elements 14, arranged to act on the locking piece 12, the work direction W of said elements being parallel to the locking direction L of the locking piece 12 arranged in the bracket 11 (FIGS. 1d and 5d). Thus, the locking piece always remains clearance-free in the locked position without separate screws or locking latches. The bracket is fastened to the rail with a locking piece manufactured in accordance with the requirements of the shape, utilizing spring force.

In the invention, the spring elements 14 are composed of a compression spring. Thus, the spring elements continuously force the locking piece to the locked position, when they are mounted at least in a partly compressed state. In the embodiments, the spring elements 14 are advantageously composed of a conical spring. Mainly based on the spring force required, a wire with a suitable thickness is selected, the number of wire coils in a conical spring being between 3 and 5. Thus, when compressed, the conical compression spring acting on the locking piece in the locking direction advantageously fits even in a space as deep as the diameter of the spring wire. In this way, the dimension referring to the entire width of the bracket can be advantageously minimized.

In the embodiments shown in the figures, a button 15 is arranged as an extension for the locking piece 12 for releasing the locking piece 12 from the locked position. In other words, the button is used to operate the locking piece while simultaneously compressing the conical spring. The same reference numbers are used for functionally identical parts. In the embodiment of FIG. 1d, the button 15 has a disc-like form, which, on one hand, provides sufficient strength and, on the other hand, a short dimension in the width direction of the bracket 11. In other words, the button is low. At the same time, a curved shape is provided on the outer surface of the button without harmful protrusions. The button 15 is connected to the locking piece 12 with a connecting screw 16. However, the use of the locking piece does not require any rotation, simply pressing the button is sufficient. In practice, the locking piece, the connecting screw and the button are connected to each other with locking paste, for example. More precisely, the connecting screw between the locking piece and the button is connected to the locking piece with locking paste. In other words, the connecting screw does not rotate. Due to the screw, fastening is easy and the arrangement can be adjusted, if required. The connecting screw can be replaced with a connecting rod, for example, which is fastened to both the locking piece and the button in some way.

For the button 15, a cavity 17 is arranged in the bracket 11, with a conical spring additionally fitted therein. The construction is extremely simple and the spring force can be adjusted by varying the tension of the connecting screw. In addition, the button is supported to the walls of the cavity and the conical spring is protected from soiling. Replacement of the conical spring is also possible and easy, and the button is mainly located in the cavity. Unlike prior art, screwing is not necessary, simple pressing is sufficient. Furthermore, the locking piece is located on the opposite side of the bracket relative to the button. The necessary movement of the locking piece is a few millimetres, and with the button, the removal and mounting of the bracket only take fractions of a second. In addition, the removal and mounting can be performed without tools. In FIG. 1d, the locking direction of the locking piece 12 is towards the right, and the look is released by pushing the button 13 towards the left, i.e. inside the bracket 11. For example, keeping a torch in place is less critical compared to a sniperscope. In any case, the locking piece is continuously pushed to the locked position, or towards the right in the embodiment of FIG. 1d, by the spring force. In practice, the button is pressed with one or more fingers, advantageously with a thumb.

Figure 2A:
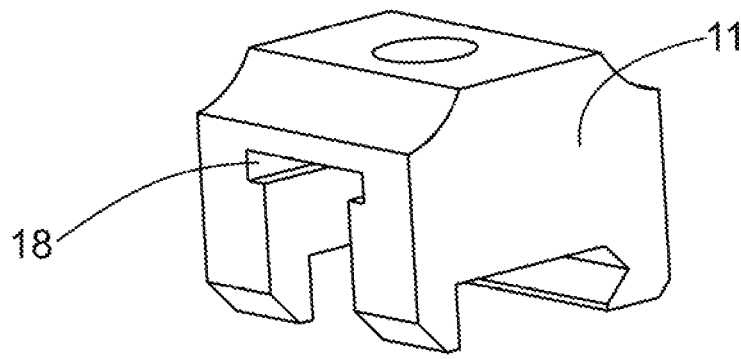
FIG. 2a is an axonometric view of the bracket of the support according to the invention.
Figure 2B:
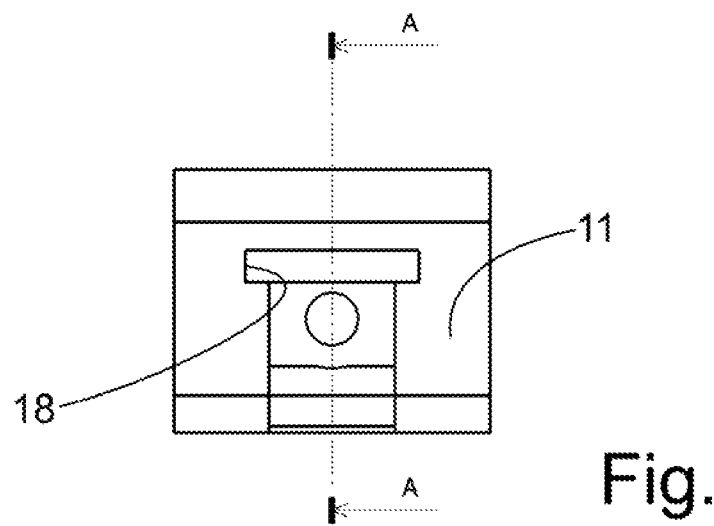
Figure 2C:
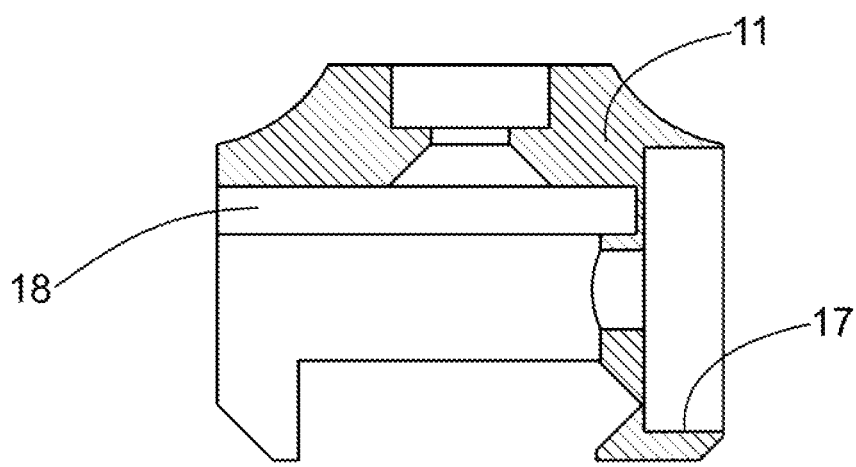
FIG. 2c is a cross-sectional view of the piano A-A of FIG. 2b.
Figure 3A:
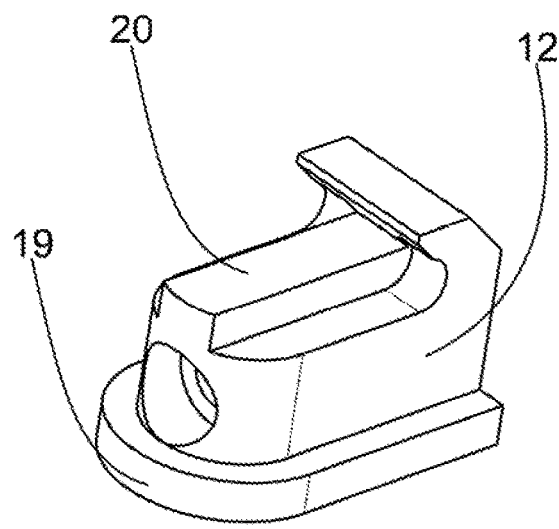
FIG. 3a is an axonometric view of the wedge piece of the support according to the invention.
Figure 3B:
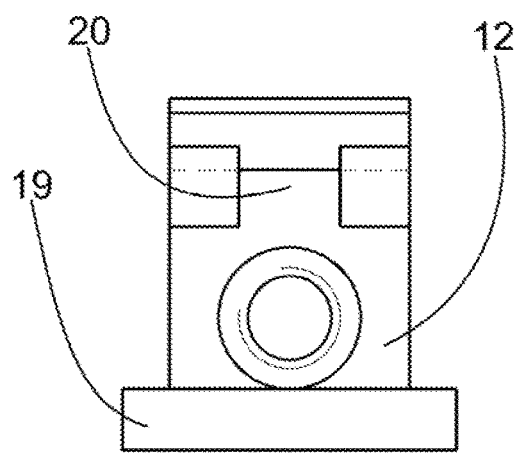
Figure 3C:
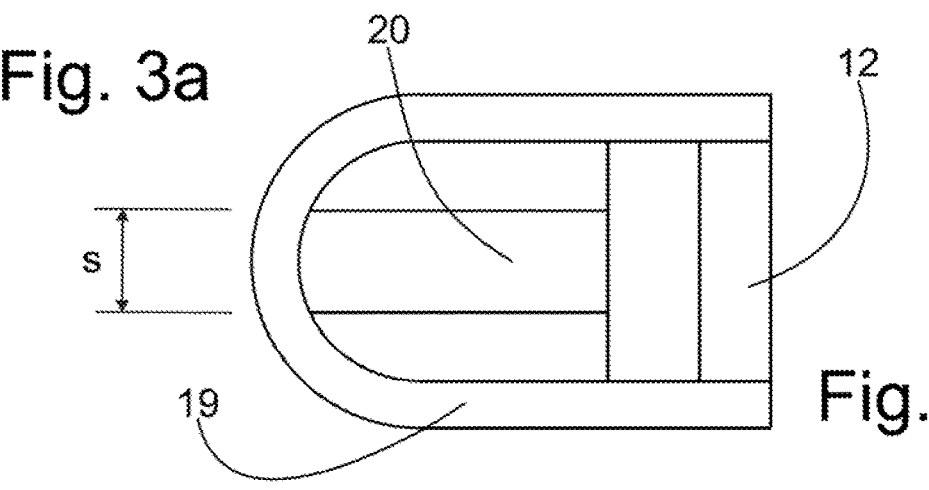
Figure 3D:
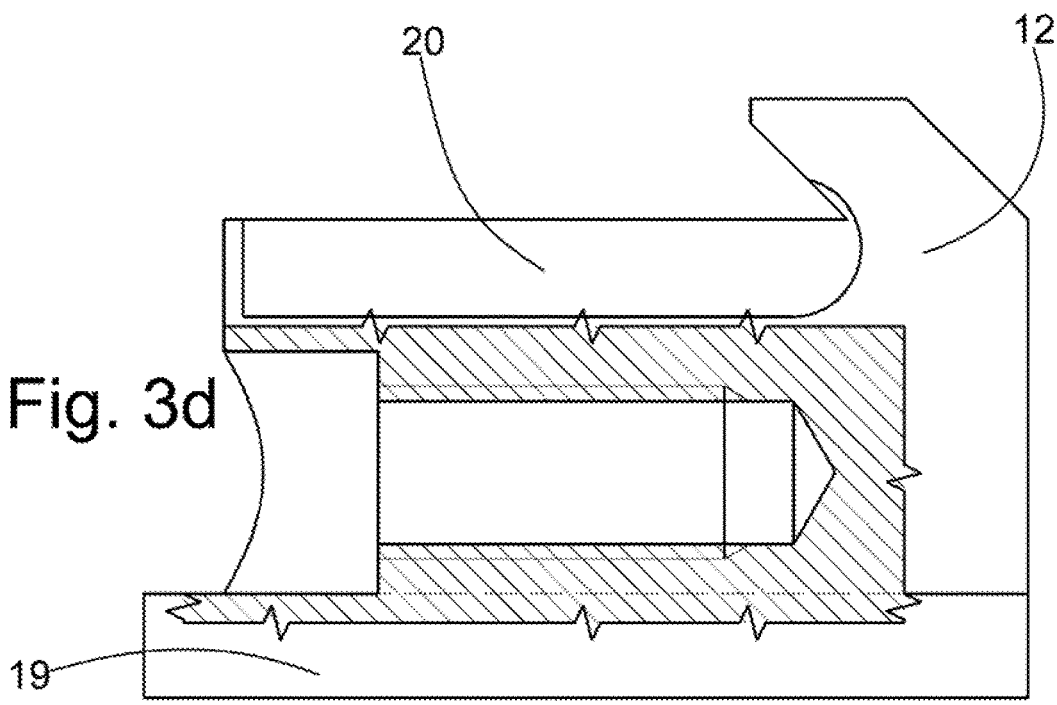

For the locking piece 12, the bracket 11 is provided with a flange-like groove 18 formed by a standard milling tool, for example, in the direction referring to locking L (FIGS. 2a to 2c). Correspondingly, the upper part of the locking piece is circled by a flange-like border 19, the shape of which is enabled by a standard milling tool (FIGS. 3a to 3d). The cross-sectional shape of the locking piece and the border circling the upper part of the locking piece together provide the locking piece with precise control in the locking direction L and as good a support as possible to all directions in conditions where the locking piece locks onto the rail. At the same time, the movement of the connecting screw remains stable, and the connecting screw is also additionally supported to the bracket over a short distance. Thus, the button also remains in the correct position. The locking piece is also supported to the groove provided in the bracket over its entire length. The shape of the locking piece is such that, in the mounting position of the bracket, it is positioned in the transverse groove provided in the Picatinny™ rail functioning in this way as a recoil element in addition to fastening to the rail. In other words, the locking piece 12 includes a recoil counterpart 20, the width s of which is a clearance less than the width S of the groove 21 included in the Picatinny™ rail (FIG. 4b). Without the recoil counterpart, the bracket can be mounted to a Weaver rail or another rail with a similar cross-section, which is not provided with grooves. On the other hand, a transverse groove can be machined in a Weaver rail in a suitable position, in which case a bracket equipped with a recoil counterpart can be used. If necessary, the bracket together with the locking piece are separately dimensioned to suit each rail.

A raw material advantageously suitable to the purpose of use of the support is an aluminium alloy that is suitable to the lightness and strength requirements. Steel is also possible as a raw material at least in some of the components. Anodizing, for example, which gives a hard and wear-resistant surface, is suitable particularly as surface finishing of aluminium. Surfaces treated in this way slide against each other moderately well, in which case the effect of friction of increasing the force of pressure is small. If necessary, a lubricant, such as arms oil, is used.

Figure 4A:
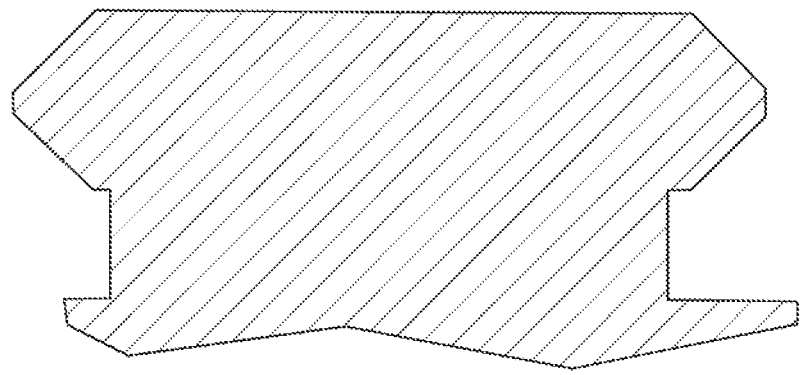
FIG. 4a is a cross-sectional view of a Picatinny™ rail.
Figure 4B:
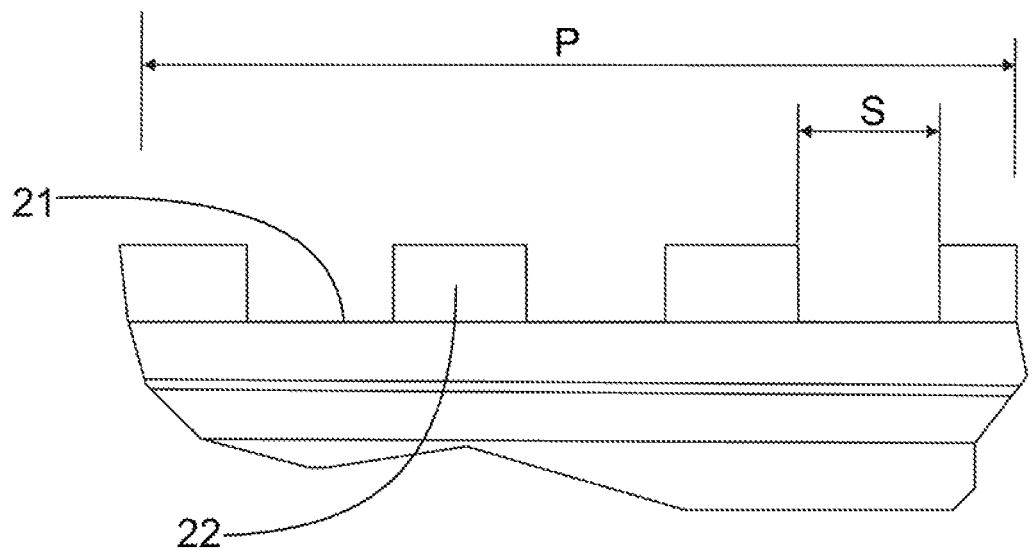
FIG. 4b is a lateral view of a part of a Picatinny™ rail.

FIGS. 4a and 4b illustrate a Picatinny™ rail, in which necks 22 and grooves 21 follow each other. Thus, the bracket of the support can be mounted to a desired position. Advantageously, the length p of the bracket 11 essentially corresponds to the length P defined by four successive necks 22 included in the Picatinny™ rail. In this case, the bracket is reliably supported on the rail. The shapes and dimensions of the Picatinny™ rail, in particular, are standardized. The shapes and dimensions of other rails are also precisely predetermined.

FIGS. 5a to 5d illustrate a second embodiment of the support 10' according to the invention. Like reference numerals in the second embodiment are shown as prime numerals and indicate like or similar components between the embodiments The design and principle of operation of the support correspond to those proposed above. Here, too, a button 15' is connected to a locking piece 12' with a connecting screw 16', which is moveably supported on a bracket 11'. Thus, by pressing the button 15', the locking piece 12' can be moved to the open position against the spring force. Here, too, the opening direction is towards the left in the figures while the conical spring 14' continuously pushes the locking piece 12 towards the right.

In the second embodiment, the button 15' is arranged around the connecting screw 16' as a rotary knob 23 for eliminating the movement of the locking piece 12'. The actual opening movement for releasing the locking piece is performed here, too, by pressing the button 15' in the direction B which is opposite the locking direction L. In addition, the movement of the locking piece can be restricted by rotating the rotary knob. In this way, locking can be secured and inadvertent release can be avoided. In other words, when securing is activated, the button cannot be pressed by any external force. In this way, the locking piece remains in the locked position and thereby, the bracket remains attached to the rail.

Basically, the functionality described above can be implemented by arranging a rotary knob in the external threads of a connecting screw. Thus, by rotating the rotary knob, the clearance between the rotary knob and the bracket can be removed, thus preventing the movement of the button and thereby, of the locking piece as well. Thus, locking of the locking piece is secured. Depending on the pitch of thread, realizing the securing action requires rotating the screw several turns, which may be too slow for release and mounting operations that must be performed quickly.

To speed up the securing action, the bracket 11' includes a limiter 24 extending to the rotary knob 23, which is arranged to allow the movement of the locking piece 12' in one position of the rotary knob 23 while restricting the movement of the locking piece 12' in a position deviating from this position. In this case, the securing effect of the rotary knob depends on the position of the rotary knob instead of the number of turns. In other words, the securing effect is provided by rotating the rotary knob clearly less than one full turn.

In the second embodiment, the limiter 24 is arranged as a slide 25 fitted inside the rotary knob 23 and connected to the locking piece 12'. More precisely, the slide 25 is unrotateably fastened to the locking piece 12 with a connecting screw 16 (the slide does not rotate relative to the locking piece). Thus, these three components move linearly as one unitary package assembly, which is loaded by a conical spring 14' fitted between the slide 25 and the bracket 11'. Here, too, the package continuously tends to move towards the right keeping the mounting of the bracket unaltered and clearance-free. The functionality of the slide 25 is realized with the rotary knob 23. Here, the rotary knob has a cylindrical inner bore 26 (FIGS. 7b and 7c), according to which the slide 25 is dimensioned. Thus, the contact between the slide and the rotary knob set within one another is clearance-free while allowing at the same time relative turning and mutual axial offset of the slide and the rotary knob. In addition, the slide 25 has a guide groove 27 (FIGS. 8a to 8d), with a corresponding cylindrical pin 28 in the rotary knob 23. Thus, the guide groove determines the mutual axial position of the slide and the rotary knob.

FIGS. 7a to 7d illustrate the rotary knob 23. Two radially extending holes 29 in the rotary knob oppose each other for holding the cylindrical pins. In this way, the rotary knob and the slide are uniformly loaded. Basically, only one cylindrical pin and guide groove are sufficient, or even three cylindrical pins may be provided. Two holes 29 each for receiving a separate cylindrical pin are shown in the figures. Installation of the cylindrical pin(s) may be secured with locking paste. The cylindrical pin(s) can be replaced with a threaded rod. In this case, the knob has a radially extending threaded hole.

FIG. 7d illustrates a modification of the rotary knob 23". Here the rotary knob 23" has two parts. The frame 32 of the rotary knob is almost similar to that of the rotary knob of FIG. 7b except that if has a smooth surface without a straight knurl. A closed shell 33 for the rotary knob is placed on the frame of the rotary knob 23" and fastened with a fixing agent. Thus, the frame 32 and the shell 33 of the rotary knob form one entity. As the shell is continuous, there are no visible grooves or counterbores in the rotary knob. In addition, the shell protects the parts and sliding surfaces located inside the rotary knob from solid impurities and splashes of water. Cylindrical pins also remain in place without locking paste, because they are kept inside the shell of the rotary knob. In addition, the shell can only be removed with a hot air blower or similar.

FIGS. 8a to 8d illustrate the slide 25. Here, two similar guide grooves 27 are provided and they are positioned on the opposite sides of the slide periphery relative to each other. In addition, each guide groove has a parallel offset. In other words, the parallel ends of the grooves are at different positions in the longitudinal direction of the slide. Thus, by rotating the rotary knob, the mutual axial position of the rotary knob and the slide changes (the rotary knob and the slide together (mutually) move in an axial direction along an axis that generally coincides with and is parallel to a longitudinal axis (centerline) of the connecting screw). Here, extensions 34 are provided in the transverse direction of the slide at both ends of the guide groove, at which extensions the mutual axial position of the slide and the rotary knob does not change. A change in mutual axial position only takes place in the rising section 37 of the guide groove (the rising section being angled relative to the transverse direction of the slide). The rising section 37 of the guide groove is disposed between the two extensions 34.

Figure 6A:
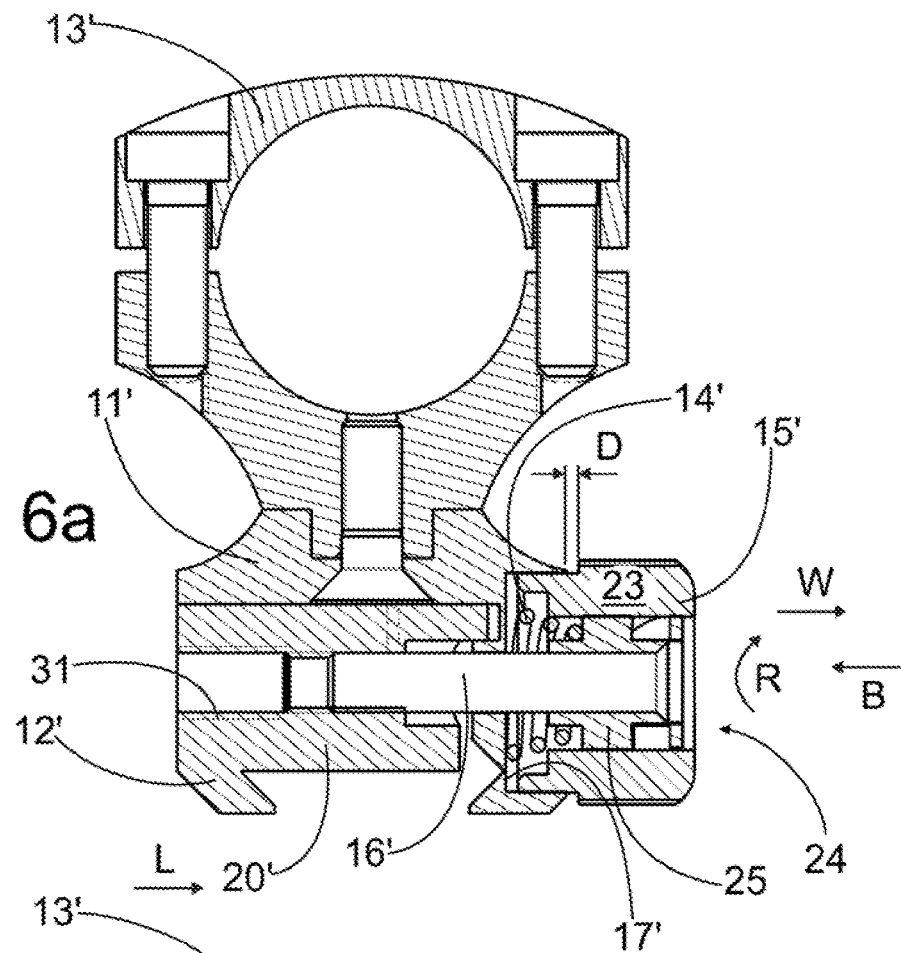
FIG. 6a shows the support of FIG. 5d in the idle position.
Figure 6B:
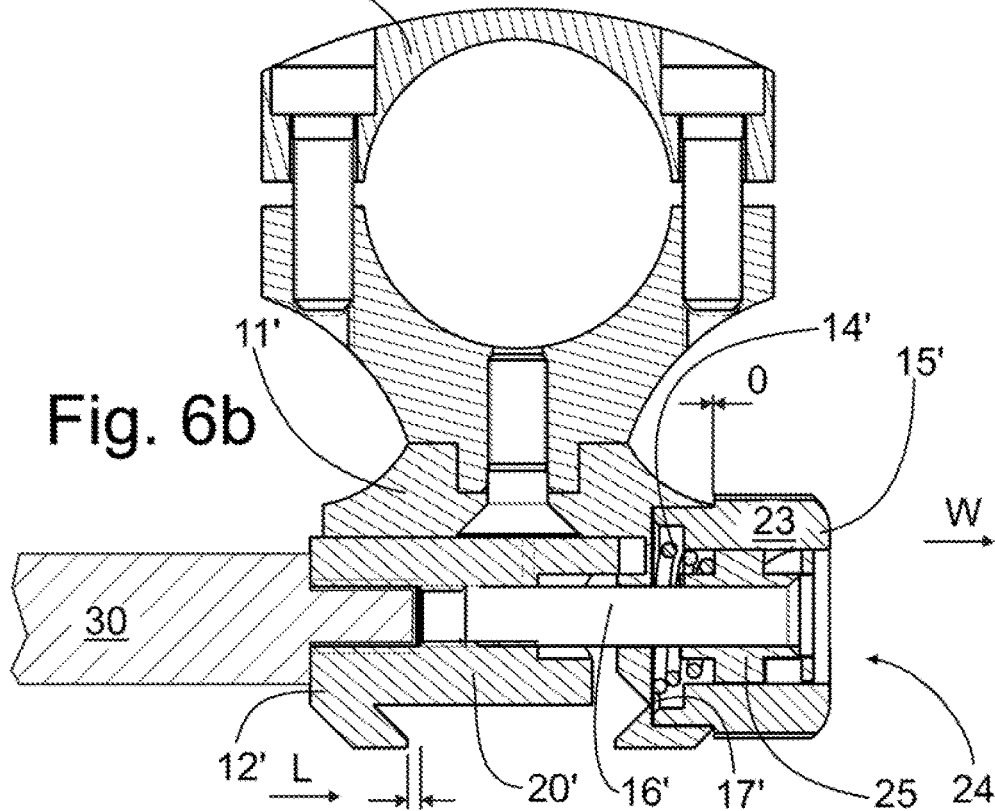
FIG. 6b shows the support of FIG. 5d in the open position.
Figure 8A:
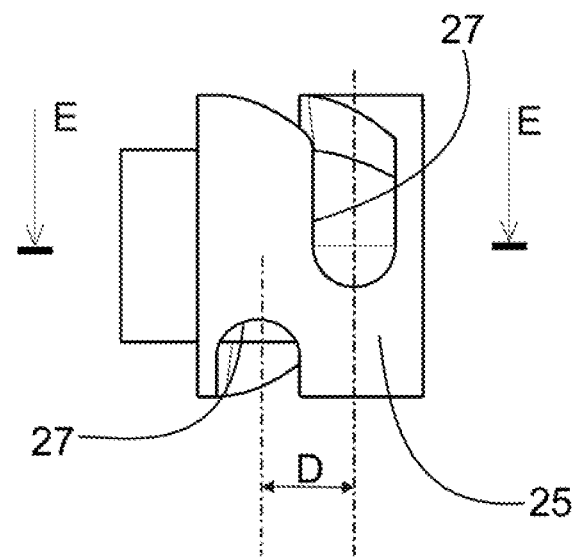
FIG. 8a is a lateral view of a slide according to the invention.
Figure 8B:
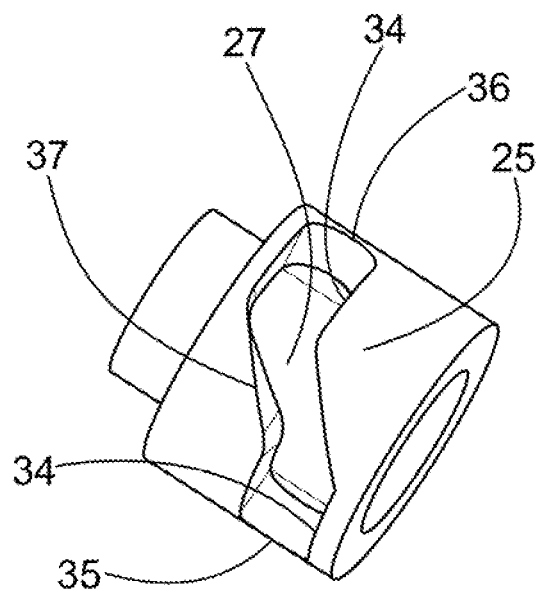
Figure 8C:
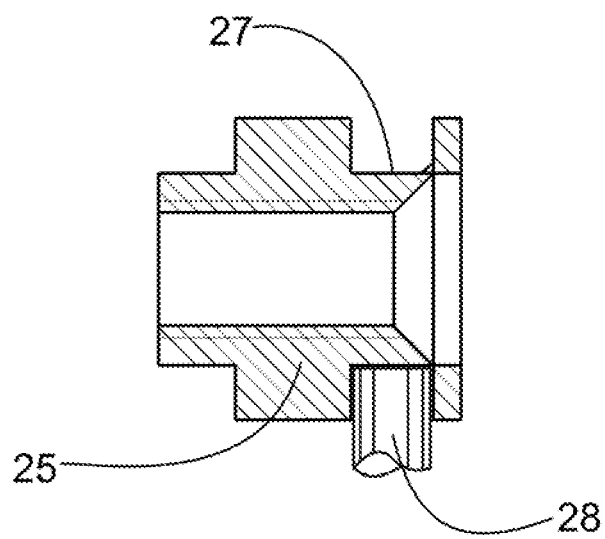
Figure 8D:
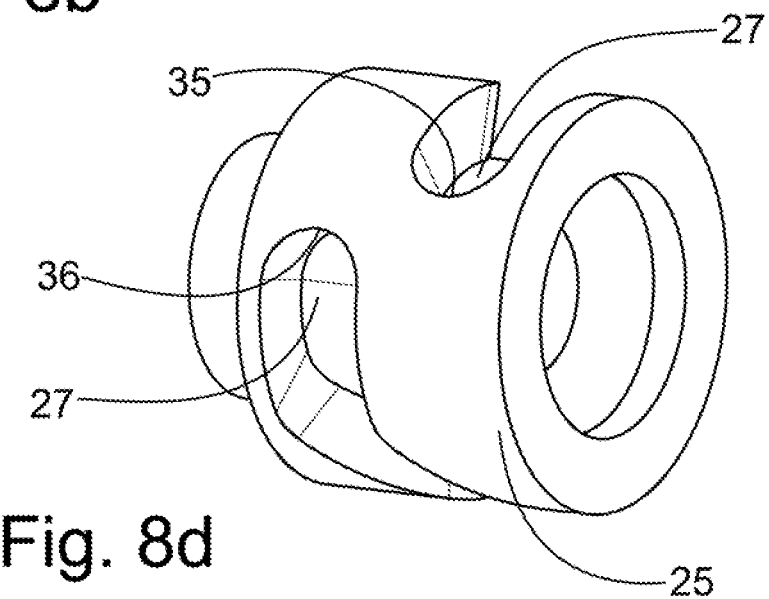
FIG. 8d is an econometric view of the slide.

In the disposition shown in FIG. 5d, locking of the locking piece is secured. Here, the rotary knob 23 butts on the bracket 11' by its end and shoulder. Thus, since it is impossible for the button to move anywhere, locking is secure. The disposition shown in FIG. 6a is otherwise similar except that here the securing action has been removed. To remove it, it is sufficient to slightly rotate the rotary knob 23, here in a counterclockwise direction R. Due to the slide and its guide groove(s), the rotary knob moves axially a few millimeters outwards when being rotated. Thus, a clearance D is created between the rotary knob and the bracket, which enables pressing of the button in the unlocking direction B (opposite the locking direction L) and thus moving the locking piece to the open position (FIG. 6b). After remounting the bracket, locking is secured by rotating the rotary knob slightly clockwise. The angle of rotation of the rising section 37 of the guide groove 27 shown in FIGS. 8b and 8c is approximately 45 degrees and, in addition, the angle of rotation of each of the end extensions 34 of the guide groove is approximately 10 degrees. In other words, the rising section of the guide groove extends approximately 45 degrees angularly along the circumference of the slide, and each extension extends approximately 10 degrees angularly along the circumference of the slide. Thus, the maximum angle of rotation of the rotary knob is approximately 65 degrees, i.e. merely less than a sixth of a turn.

Advantageously, all components are machined with one tool mounting. In this way, the accuracy of dimensions and shape is ensured and thus, the bracket and the mounting foot will always be in the same position, regardless of repeated releasing and mounting operations. Thus, aiming a weapon equipped with a sniperscope, for example, is not necessary after removing and mounting a sighting device.

The assembly and use of the support is described below. The support is immediately ready for use after the manufacturer's assembly. When reassembling various components after maintenance, adjustments or repair by the user, the components are carefully cleaned to remove any impurities. The locking piece is slid to the bracket, and the slide together with the rotary knob and then the conical spring are placed in the connecting screw. The rotary knob is turned to the secured position, in which the ends of the slide and the rotary knob are flush (FIG. 5d). After this, the connecting screw is turned to such an extent that the shoulder of the rotary knob butts on the bracket. At the same time, the rotary knob butts on the bottom of the cavity in the example shown. Locking paste is used in the connecting screw so that various components are unrotating except for the rotary knob, which turns around the slide. When turning the rotary knob to the open position, the clearance mentioned above is created, allowing pushing of the button and thus moving the locking piece so that the removal and mounting of the bracket is possible. In the embodiment proposed, the clearance is 3.5 mm; however, a movement as small as two millimetres enables removal of the bracket. Thus, a practical clearance is between 2 and 4 mm.

The bracket is mounted as follows. The bracket is placed on the rail tilting the bracket to the side of the button. Next, it is explored when the recoil counterpart of the locking piece arrives at the corresponding groove of the rail. Then the button is pressed down and the bracket is turned to the horizontal position. Finally, when releasing the button, the bracket is fastened in place. The securing action is provided by turning the rotary knob clockwise until resistance is felt. The bracket is removed as follows. The rotary knob is turned counterclockwise to the open position. The button is pressed down while simultaneously tilting the bracket to the side of the button, at which the support is released from the rail. Two supports of a sighting device are used simultaneously according to the instructions given above. Two hands are used, if necessary.

Various accessories can be mounted on the bracket with screws. FIG. 6b illustrates an accessory 30, which is mounted on the locking piece 12'. For this, the locking piece Is provided with a threaded hole 31 (shown in FIG. 6a). This increases possibilities of mounting accessories and improves the usability of the bracket.

It is important to note that the connecting screw, the locking piece, and the slide are bonded together with thread-locking compound (e.g., locking paste) to create a unified clamp assembly. The connecting screw is turned only during the assembly stage to adjust the axial position of locking piece and thereby conforming to Picatinny™ rail dimensional specifications.

As shown in FIGS. 8a to 8d and 9a to 9c, the head of each cylindrical pin 28 follows a respective guide groove 27 from a starting point 35 to an end point 36. The rotary knob 23 is rotated counterclockwise to maximize the clearance D. In this position, pressing the button 15' enables removal of the support from the Picatinny™ rail. When the rotary knob 23 is rotated clockwise, the clearance D becomes zero. In other words, when the rotary knob 23 is turned clockwise, the cylindrical pin 28 follows the pitch of the rising section 37 of the guide groove 27 and thereby cause an axial movement of the rotary knob to the left (as viewed in the FIGS. 9a and 9b). The rotation of the rotary knob is ended by the end point 36 of the guide groove 27. In this position, the support is securely locked in the Picatinny™ rail. The support cannot be detached by accident. At the end point 36, the clearance D is zero, preventing axial movement of the locking piece 12', thus locking the support on the Picatinny™ rail.

The assembly of the support according to one embodiment of the invention is as follows. The connecting screw 16' of the rotary knob 23 is fixed to the slide 25 using thread-locking compound. The guide grooves 27 are properly lubricated with low viscosity oil. The slide 25 is mounted inside the rotary knob 23, as shown for example in FIG. 9a. The cylindrical pins 28 are put into the holes 29 in the rotary knob 23 and pushed into bottom of the guide grooves 27, as shown for example in FIG. 9a. The rotary knob 23 and the slide 25 are thereby engaged with each other by the two cylindrical pins 28. Only the rotating of the rotary knob 23 causes these two components to turn relative to each other within the limits of the start point 35 and the end point 36 of the guide grooves. The flange-like groove 18 is lubricated with non-dripping lubricant. Thread-locking compound is applied into the thread of the locking piece 12', from the rounded end of the locking piece 12'. The locking piece 12' is inserted into the flange-like groove 18, the flange-like border 19 of the locking piece being inserted first. The connecting screw 16' with the conical spring element 14' and the slide 25 is screwed in place. The rotary knob 23 is rotated clockwise to the end point 36 of the guide groove and then, when the rotary knob 23 is pressed to the bottom of the cavity 17', the connecting screw 16' is adjusted with a tool until the clearance D is zero. This adjustment must be done before the thread-locking compound in the locking piece threads cures. Once the thread-locking compound is cured, the locking piece 12' and the connecting screw 16' and slide 25 are a single unitary component that moves in the axial direction as the button is pressed or released. The rotary knob 23 is rotated clockwise to the end points 36 of the guide grooves 27. At this point, the clearance D is zero (see FIG. 9c). When rotary knob 23 is rotated counterclockwise to the start points 35 of the guide grooves 27, the clearance D is the greatest (see FIG. 9a). The rotary knob 23 can then be pushed inwardly to disengage and tilt the support from the Picatinny™ rail. At the end, the function of the finished assembly is checked and tested. After testing, the shell 33 of the rotary knob is pushed in place, as shown in FIG. 9c. After assembly, if necessary, the shell may be removed only by using, for example, a hot air gun.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A support for mounting an accessory to a weapon, the support comprising:
   a bracket;
   a locking piece fitted in the bracket;
   a spring element that acts on the locking piece, a work direction of said spring element being parallel to a locking direction of the locking piece;
   a button for releasing the locking piece from a locked position by pushing in an opposite direction than the locking direction, the button forming an extension of the locking piece;
   a connecting screw that connects the button to the locking piece, the connecting screw being fixed to the locking piece with locking paste, and the connecting screw being movable in relation to the bracket and supported by the bracket;
   the button including a rotary knob for eliminating movement of the locking piece;
   a limiter including a slide fitted inside the rotary knob and connected to the locking piece by the connecting screw;
   the slide being set within the rotary knob, the rotary knob turning around the slide, and the slide comprising a guide groove having an extension at both ends, at which extensions the axial position of both the slide and the rotary knob does not change, and the guide groove having a rising section between said extensions at which the axial position of both the slide and the rotary knob does change;
   the slide being unrotateably fastened to the locking piece with the connecting screw, wherein the slide, the connecting screw, and the locking piece together forming a unitary assembly that moves in the bracket; and
   a cylindrical pin disposed in the rotary knob and extending into the guide groove, the guide groove and corresponding cylindrical pin determining the axial position of the slide relative to the rotary knob;
   wherein the guide groove has a start point, at which position a clearance exists between the bracket and the rotary knob allowing movement of the locking piece in an unlocking direction by pushing the button, and an end point, at which position the rotated rotary knob contacts the bracket without any clearance, thereby prohibiting movement of the locking piece.

2. The support according to claim 1, wherein the clearance is between 2 and 4 mm.

3. The support according to claim 1, wherein a maximum angle of rotation of the rotary knob is 65 degrees.

4. The support according to claim 1, wherein the rotary knob has a frame and a shell installed onto the frame.

5. The support according to claim 4, wherein the frame has a hole for the cylindrical pin, and the shell covers an end of the hole.

6. The support according to claim 1, wherein the slide is fastened to the connecting screw with locking paste.

7. The support according to claim 1, wherein the locking piece has a recoil counterpart.

8. The support according to claim 1, including two of said guide grooves.

9. The support according to claim 8, including two of said cylindrical pins, each cylindrical pin corresponding to one of said guide grooves.

10. The support according to claim 1, wherein the spring element is composed of a compression spring.

11. The support according to claim 10, wherein the spring element is composed of a conical spring.

12. The support according to claim 11, wherein a total number of wire coils of the conical spring comprises 3 to 5 wire coils.

13. The support according to claim 1, wherein the spring element is arranged between the bracket and the slide.

14. The support according to claim 1, wherein the bracket has a cavity for the button.

15. The support according to claim 1 in combination with a Picatinny™ rail, wherein the locking piece includes a recoil counterpart, the recoil counterpart having a width which is less than a width of a groove included in the Picatinny™ rail.

16. The support according to claim 1 in combination with a Picatinny™ rail, wherein the bracket has a length which corresponds to a distance defined by four successive necks included in the Picatinny™ rail.

\* \* \* \* \*